(12) United States Patent
Contolini et al.

(10) Patent No.: US 7,844,045 B2
(45) Date of Patent: Nov. 30, 2010

(54) INTELLIGENT CALL ROUTING AND CALL SUPERVISION METHOD FOR CALL CENTERS

(75) Inventors: Matteo Contolini, Santa Barbara, CA (US); Jean-Claude Junqua, Santa Barbara, CA (US)

(73) Assignee: Panasonic Corporation, Osaka (JP)

( * ) Notice: Subject to any disclaimer, the term of this patent is extended or adjusted under 35 U.S.C. 154(b) by 1467 days.

(21) Appl. No.: 10/869,810

(22) Filed: Jun. 16, 2004

(65) Prior Publication Data

US 2005/0286705 A1 Dec. 29, 2005

(51) Int. Cl.
*H04M 3/00* (2006.01)

(52) U.S. Cl. .............................. 379/265.12; 379/88.01; 379/265.06; 379/266.1

(58) Field of Classification Search .. 379/265.01–266.1
See application file for complete search history.

(56) References Cited

U.S. PATENT DOCUMENTS

| | | | |
|---|---|---|---|
| 5,493,608 A | 2/1996 | O'Sullivan | |
| 5,553,119 A | 9/1996 | McAllister et al. | |
| 6,058,163 A | 5/2000 | Pattison et al. | |
| 6,134,315 A | 10/2000 | Galvin | |
| 6,163,607 A | 12/2000 | Bogart et al. | |
| 6,185,292 B1 | 2/2001 | Miloslavsky | |
| 6,292,778 B1 * | 9/2001 | Sukkar ..................... | 704/256.4 |
| 6,314,177 B1 | 11/2001 | Davis et al. | |
| 6,347,139 B1 | 2/2002 | Fisher et al. | |
| 6,389,400 B1 | 5/2002 | Bushey et al. | |
| 6,411,687 B1 | 6/2002 | Bohacek et al. | |
| 6,453,038 B1 | 9/2002 | McFarlane et al. | |
| 6,510,221 B1 | 1/2003 | Fisher et al. | |
| 6,535,600 B1 | 3/2003 | Fisher et al. | |
| 6,553,114 B1 | 4/2003 | Fisher et al. | |
| 6,570,980 B1 * | 5/2003 | Baruch ................... | 379/265.12 |
| 6,581,105 B2 | 6/2003 | Miloslavsky et al. | |
| 6,584,192 B1 | 6/2003 | Agusta | |
| 6,661,889 B1 * | 12/2003 | Flockhart et al. ........ | 379/265.05 |
| 6,798,876 B1 * | 9/2004 | Bala ....................... | 379/265.12 |
| 6,868,154 B1 * | 3/2005 | Stuart et al. ............. | 379/265.06 |
| 7,376,570 B2 * | 5/2008 | Sone .............................. | 705/1 |
| 2002/0046030 A1 * | 4/2002 | Haritsa et al. ................ | 704/256 |
| 2003/0152199 A1 * | 8/2003 | Kuhn et al. ............... | 379/88.01 |
| 2004/0264677 A1 * | 12/2004 | Horvitz et al. .......... | 379/265.02 |

FOREIGN PATENT DOCUMENTS

| | | |
|---|---|---|
| EP | 0740450 | 10/1996 |
| EP | 1039732 A2 | 9/2000 |

* cited by examiner

*Primary Examiner*—Simon Sing
(74) *Attorney, Agent, or Firm*—Harness, Dickey & Pierce, P.L.C.

(57) ABSTRACT

A call routing and supervising system includes an input receiving customer speech from a remote location, and a voice characteristics extractor extracting voice characteristics from the customer speech, such as language/dialect/accent, age group, gender, and eigendimension coordinates. A customer service representative selector selects one or more customer service representatives based on profiles of the customer service representatives respective of customers having voice characteristics similar to the extracted voice characteristics. In other aspects, a call monitor automatically analyzes dialogue between the customer and the customer service representative, such as detected interruptions, tracked dialogue turns, and recognized key phrases indicating frustration, polity, and/or resolution characteristics of dialogue. The call monitor records performance of the customer service representative respective of customers having the voice characteristics. Automatic call rerouting and/or real-time instruction of call center personnel can also be accomplished based on analysis results.

23 Claims, 4 Drawing Sheets

INTELLIGENT CALL ROUTING AND CALL SUPERVISION METHOD FOR CALL CENTERS

FIELD OF THE INVENTION

The present invention generally relates to call center automation techniques, and relates in particular to automated call routing and supervision based on recognized customer voice characteristics and recognized dialogue character and content.

BACKGROUND OF THE INVENTION

Call centers are a necessity for most companies and corporations with a large customer base. Nevertheless, call centers are often also cost centers, and thus the need to reduce their operational cost is felt by a large majority of such companies. Several methods have been devised to cut costs, such as fully automating certain services to reduce the personnel cost, and reducing the average call duration to cut the telecommunication cost. When costs are cut, it remains important to keep a high level of customers satisfaction.

A current trend is to improve efficiency and customer satisfaction by matching customers or customers' requests with Customer Service Representatives (CSRs) in an optimal way. This optimal matching translates into higher customer satisfaction because the CSR is well prepared to deal with the customer's request, and also yields cost savings since CSRs can handle requests more efficiently and thus serve more customers over a given period of time.

Currently used methods for customer—CSR matching include retrieving previously-collected information about the customer (e.g., by asking the customer to enter an account number) and collecting information from the customer about the reason for the call (typically via an IVR system which can be navigated by DTMFs or by voice). In both cases, this information is collected immediately after the call is connected, and used to determine which CSR the call should be routed to. The customer's preferred language is often determined, either explicitly (the customer presses a button to select a specific language) or implicitly (by means of a language selection/recognition algorithm), so that the call can be routed to a CSR who speaks the language. However, such systems only connect customers to CSRs that can speak the same language. Typically, these systems are deployed only in countries where more than one language is commonly spoken (e.g. English and French in Canada, English and Spanish in the US). In contrast, the present invention is extremely useful even in countries where only one major language is spoken, but where there are some dialectal differences.

SUMMARY OF THE INVENTION

In accordance with the present invention, a call routing and supervising system includes an input receiving customer speech from a remote location, and a voice characteristics extractor extracting voice characteristics from the customer speech, such as language/dialect/accent, age group, gender, and eigendimension coordinates. A customer service representative selector selects one or more customer service representatives based on profiles of the customer service representatives respective of customers having voice characteristics similar to the extracted voice characteristics. In other aspects, a call monitor automatically analyzes dialogue between the customer and the customer service representative, such as detected interruptions, tracked dialogue turns, and recognized key phrases indicating frustration, polity, and/or resolution characteristics of dialogue. The call monitor records performance of the customer service representative respective of customers having the voice characteristics. Automatic call rerouting and/or real-time instruction of call center personnel can also be accomplished based on analysis results.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

The present invention relates to improving efficiency and customer satisfaction in call centers. Certain CSRs, because of their background, education, or other factors, may be more suitable for handling communications with customers from certain regions, origins, or ethnic groups. For example, when the caller and the CSR are both native speakers of the dominant language (e.g., American English), it is a good idea to assign callers to CSRs speaking the same dialect. This assignment improves communication efficiency (e.g., use of slang) and makes the customer more comfortable.

Figure 1:
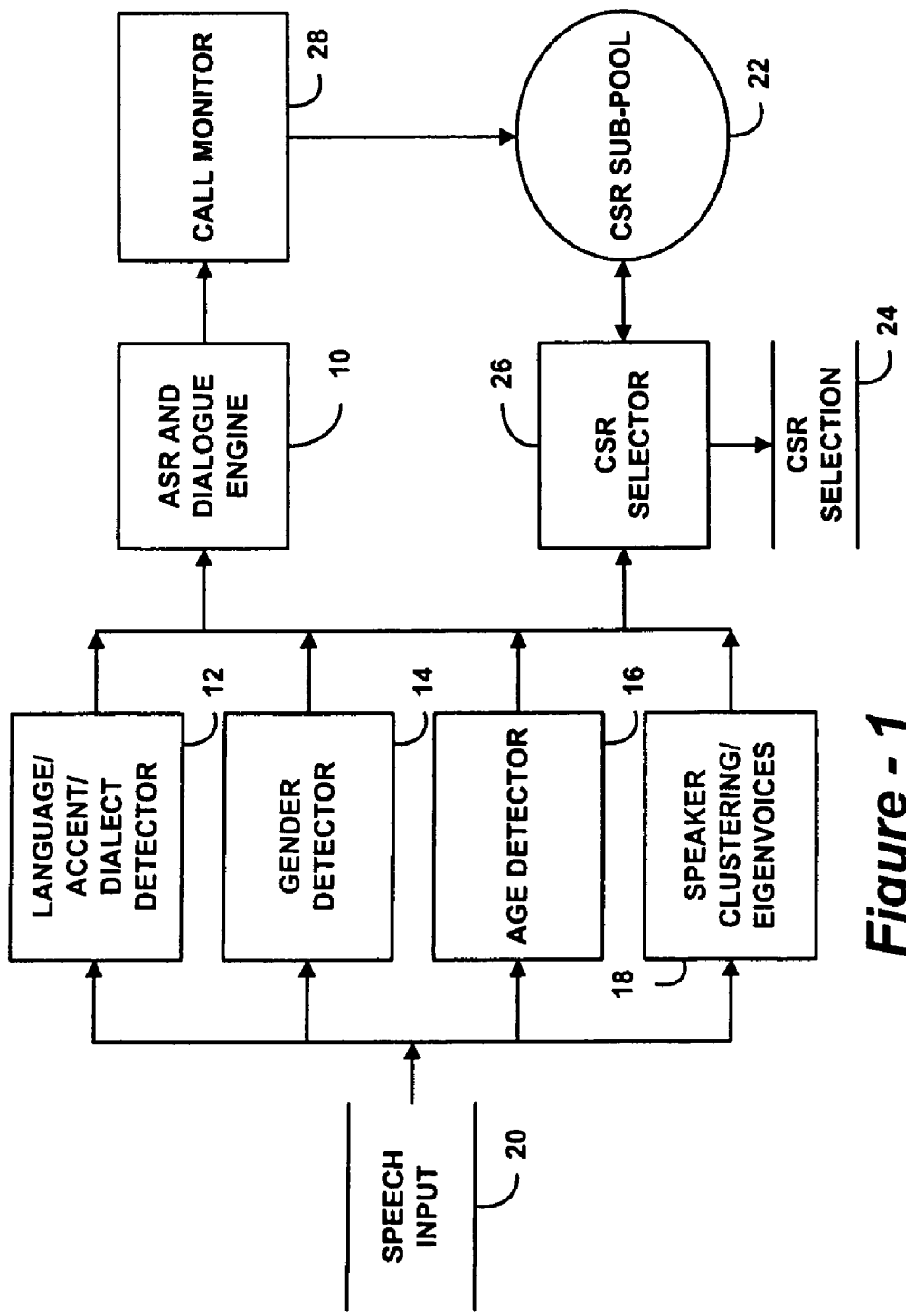
FIG. 1 is a block diagram illustrating a call routing and supervising system according to the present invention.

Referring to FIG. 1, some embodiments contain various modules 10-18 receptive of speech input 20, including: a speech recognition engine coupled to a dialogue engine 10; modules 12 to determine the foreign accent and/or dialect of callers; modules 14-16 that detect and classify callers according to their gender, age group (i.e., child, adult, elderly, etc.), and voice loudness (not shown); a module 18 (based on Gaussian Mixture Model (GMM) or eigenvoice analysis) capable of learning other characteristics of callers' voices that are useful for classification; a module that analyzes the syntax and vocabulary used by the caller; and a speaker identification module (not shown) to identify individuals who have previously called. Eigenvoice analysis is discussed in greater detail in R. Kuhn et al, "Eigenvoices for Speaker Adaptation", in Proceedings of International Conference on Spoken Language Processing (ICSLP), Sydney, Australia, December 98; R. Kuhn et al, "Rapid Speaker Adaptation in Eigenvoice Space", in IEEE Transactions on Speech and Audio Processing, November 2000; U.S. Pat. Nos. 6,327,565; 6,697,778; 6,343,267; 6,571,208; and 6,263,309, all of which are incorporated by reference herein in their entirety.

The invention provides criteria for selecting the subset 22 of CSRs who are most suitable for a given customer. Customers are classified into groups defined by such criteria as language or origin, dialect, and word choice. Speech databases are currently available that indicate the region or origin of each speaker, even for foreign speakers. It is therefore possible to build several acoustic models, one for each geographical region, by pooling together all the speakers from that region. When a new customer calls, all the acoustic modes are run in parallel, and the dialect of the customer is assumed to be the one corresponding to the acoustic model that gives the highest likelihood. Similarly, a statistical classification system assigns a value for the current customer in each of the other dimensions considered (gender, age group, word choice). A value in the age group dimension can be assigned by using techniques such as vocal tract length normalization and/or pitch detection. A CSR selection 24 is then made by CSR selector 26 according to his/her skills, characteristics and/or performance data for each of the customer groups. By increasing the likelihood that the customer and CSR understand each other clearly, the time taken for the transaction is decreased and customer satisfaction is increased.

Some embodiments classify customers using modules that are trained or specialized to identify specific characteristics of the customer (e.g., gender, age group, accent, speaking rate). Accent analysis is discussed in greater detail in P. Angkititrakul, J. H. L. Hansen, "Use of Trajectory Models for Automatic Accent Classification", INTERSPEECH-2003/Eurospeech-2003, pp. 1353-1356, Geneva, Switzerland, September 2003; P. Angkititrakul, J. H. L. Hansen, "Stochastic Trajectory Model Analysis for Accent Classification", International Conference on Spoken Language Processing (ICSLP), vol. 1, pp. 493-496, Denver, Colo. USA, September 2002; L. Arslan, J. H. L. Hansen, "Language Accent Classification in American English", Speech Communications, vol. 18(4), pp. 353-367, July 1996, all of which are incorporated by reference herein in their entirety. Alternatively or in addition, some embodiments include a module that is purely data driven and that automatically discovers common features that are useful for the customer classification. Considering, for example, the eigenvoice approach, it may turn out that a certain CSR is particularly efficient in helping customers that have a high value in, say, eigendimension 7. Even though it might not be obvious which voice or speaker characteristic eigendimension 7 might represent, the invention nevertheless provides a way to improve efficiency and customer satisfaction.

Since the system has learning capabilities, it automatically tunes itself and always converges toward the optimal performance, without the need of expensive and time-consuming supervision. A new CSR is initially assigned calls from each of the customer groups according to a uniform distribution. Alternatively, some prior knowledge of accent, skills with languages, speaking speed, and others can be used to initially rate CSRs respective of customer groups. After some time, the average "performance" of this CSR is evaluated for each group, and the call distribution is biased toward the customer group where he/she has best "performance". The customer distribution for each CSR is then updated periodically, as are the customer groups. The performance of a CSR can be estimated implicitly by considering the number of turns and time necessary to solve a particular problem, by looking at the presence of certain keywords in the customers' speech (e.g., "thank you", "you were helpful") and by detecting variations in speech rate and loudness, or explicitly by asking the customer to contribute to a survey.

The algorithm for routing customers to CSRs benefits from information about previous interactions. If a customer has been identified as a returning customer (possibly by the speaker ID module of the system), the call may be routed to the same CSR if the interaction was productive and pleasant for the customer; in the converse case, the customer may be routed to a new CSR. In doubtful cases, the application can ask the customer whether he or she prefers to be served by the same CSR who helped him/her in the past. The pleasantness of an interaction can be estimated through analysis of the text transcript, presence of certain keywords and or polite forms, and uniformity of speech rate and loudness.

In the invention, the ASR system can also be coupled to a dialogue engine so that the level of experience required by the CSR can be determined. For example, if customer confusion or query complexity is detected based on recognized keywords, interruptions, and/or repetitions, the customer can be transferred to an experienced CSR; routine queries can be handled by novice CSRs. Additionally, the system has a call monitor 28 that keeps monitoring each conversation to provide an estimate of the time when each CSR will become available. The call monitor 28 keeps track of the stage of each conversation (e.g., initial greetings, problem statement, troubleshooting, closing greetings) and estimates the time to completion for each call based on the type of problem, customer and CSR profiles, and the previous call history. In this way, if the optimal CSR is estimated to be busy for an amount of time exceeding a predetermined threshold, the call can be immediately routed to a sub-optimal CSR, so that the customer does not have to wait unnecessarily.

FIG. 1 illustrates an example of processing performed prior to connecting the customer to the CSR. The speech input 20 received from a customer is analyzed by independent modules 12-18, which provide input to a customer model module that selects an appropriate customer model category (not shown). The CSR selector 26 receives input from the customer model, ASR & dialogue engine, and call monitor modules, and chooses the most appropriate CSR in the CSR pool 22 for the current customer. Previous interaction with customers are taken into consideration by the ASR & dialogue engine 10 to adopt an appropriate dialogue strategy and vocabulary and to use an adapted acoustic model, if available. The call monitor also uses information about previous interactions and from the ASR & dialogue engine 10 (e.g., dialogue stage, speech rate) to estimate the availability time for each suitable CSR.

The call monitor is connected to each of the CSRs so that at any time it is able to provide an expected time of availability for a particular CSR requested by the CSR selector module in FIG. 1. The Call Monitor also collects statistics about the current call (e.g., type of query, speaking rates, CSR performance, call duration, vocabulary usage), which are used to update the CSR and customer profiles and the CSR to customer matching strategy implemented in the CSR selector. Such statistics are also used to determine the appropriateness of the Customer Model, and to switch to a different one, if appropriate. Information about the current call is logged in the customer interaction database (not shown).

Another function of the call monitor 10 is to control the CSR feedback module, based on input it receives from the ASR & dialogue engine 10 and on the current CSR and customer profiles. Such feedback is provided in terms of visual or audible messages to the CSR and may provide warnings (e.g., the CSR is speaking too quickly, stress or anger are detected from the customer) or hints (e.g., current customer is a foreign or elderly person, and the CSR needs to pay particular attention in speaking clearly).

Figure 2:
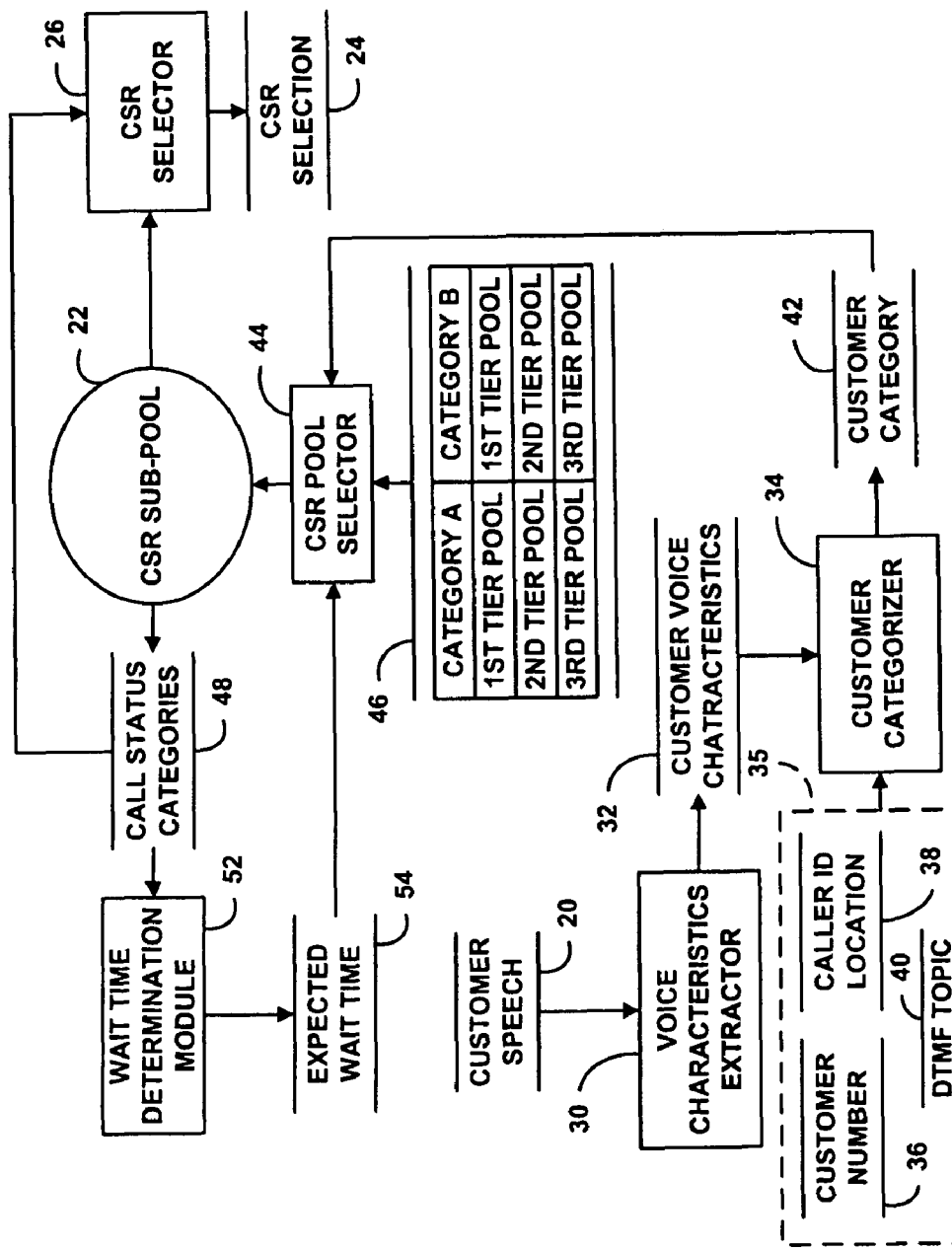
FIG. 2 is a block diagram illustrating customer service representative selection components of the call routing and supervising system according to the present invention.

Turning to FIG. 2, customer service representative selection components of the call routing and supervising system according to the present invention are examined in greater detail. Voice characteristics extractor 30 received customer speech input from a remote location and extracts voice characteristics 32 of the customer. Customer categorizer 34 receives the voice characteristics 32 and additional information 35, such as customer number 36, caller ID location 38, and a DTMF identified topic of discussion 40, and selects an appropriate customer category 42. In some embodiments, CSR pool selector 44 receives the customer category 42 and selects the first tier pool from CSR performance data 46 for that category as subset 22. If one or more CSRs is available, then CSR selector selects from among the available CSRs the CSR with the highest performance respective of the category. If not, then the call status categories 48 of each call in progress of all the CSRs in the currently selected pool is used by wait time determination module 52 to predict an expected wait time 54 for a next available CSR in the current pool. CSR pool selector responds to the expected wait time 54 by selecting the next lowest tier pool according to performance data 46 if the wait time 54 is too long. This process iterates until a CSR selection 24 is made, returning to the top tier pool if the lowest tier has too long a wait time 54.

In other embodiments, a cost function may be used to select the CSR. This cost function may take the form $C_i = \mu T_i - (1-\mu) O_i$, where $T_i$ is the expected waiting time for CSR i, $O_i$ is the optimality measure of CSR i, $\mu$ is a weighing parameter ranging between 0 and 1, and i is an index referring to CSRs in the whole pool (i goes from 1 to N, where N is the total number of CSRs), and thus a cost value can be assigned to each CSR. Then the selection can be performed by choosing the CSR i with lowest assigned cost $C_i$. Note that the parameter $\mu$ can be tuned to shift the emphasis on routing decisions toward waiting time or optimality, according to the Call Center strategy. It is envisioned that the aforementioned embodiments may not be exclusive, but can be combined in various ways.

Figure 3:
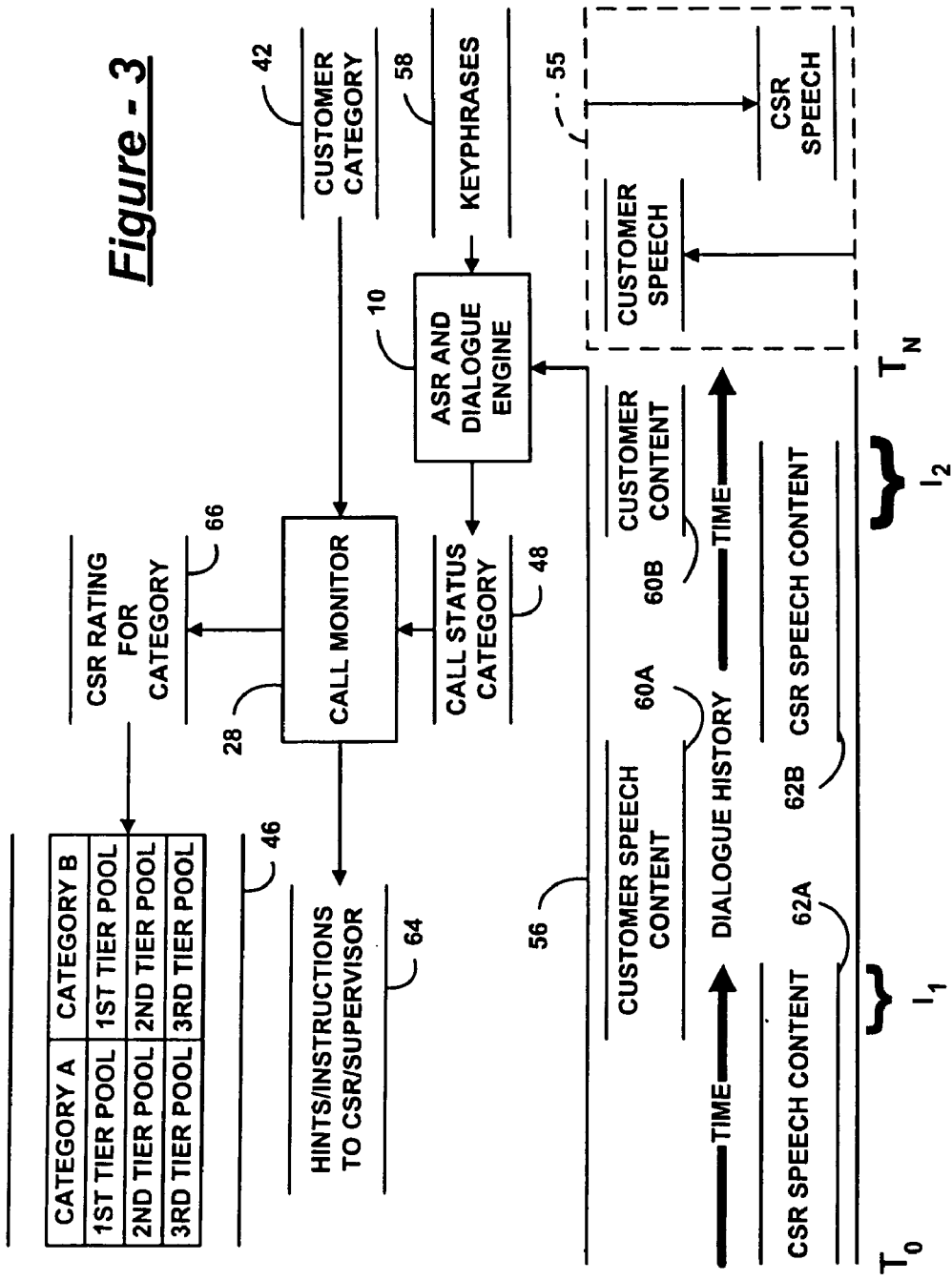
FIG. 3 is a block diagram illustrating call supervision components of the call routing and supervising system according to the present invention.

Turning now to FIG. 3, call supervision components of the call routing and supervising system according to the present invention are examined in greater detail. ASR and dialogue engine 10 monitors dialogue 55 between the customer and CSR and records a dialogue history 56 over time between start time $T_0$ and current time $T_N$. ASR and dialogue engine 10 compares predefined key phrases 58 to customer speech content 60A and 60B and CSR speech content 62A and 62B. Frustration and polity can therefore be detected, and interruptions I1 and I2 can be detected as customer and CSR speaking at the same time. Dialogue turns can also be detected and the number of dialogue turns tracked along with the call time. Customer speech content from one dialogue turn can be compared to customer speech content from a previous dialogue turn to determine if customers are forced to repeat themselves, and the same is true of CSR speech. Accordingly, ASR and dialogue engine 10 can select an appropriate call status category 48 for the call on an ongoing basis and communicate it to call monitor 28.

Call monitor 28 receives the customer category 42 and the call status category 48 and selects predefined hints and instructions 64 for communication to the CSR based on the received information. For example, call monitor 28 can assist the CSR in conversing with the customer by displaying recognized customer speech as text and/or telling the CSR to slow down or reroute the call. Call monitor 28 can also instruct the CSR to reroute the call, perhaps to a supervisor. Finally, once the call is completed and a final call status category 48 has been selected, partially based on call resolution characteristics, then call monitor 28 may rate the CSR respective of the customer category 42 in CSR performance data 46 as at 66.

Figure 4:
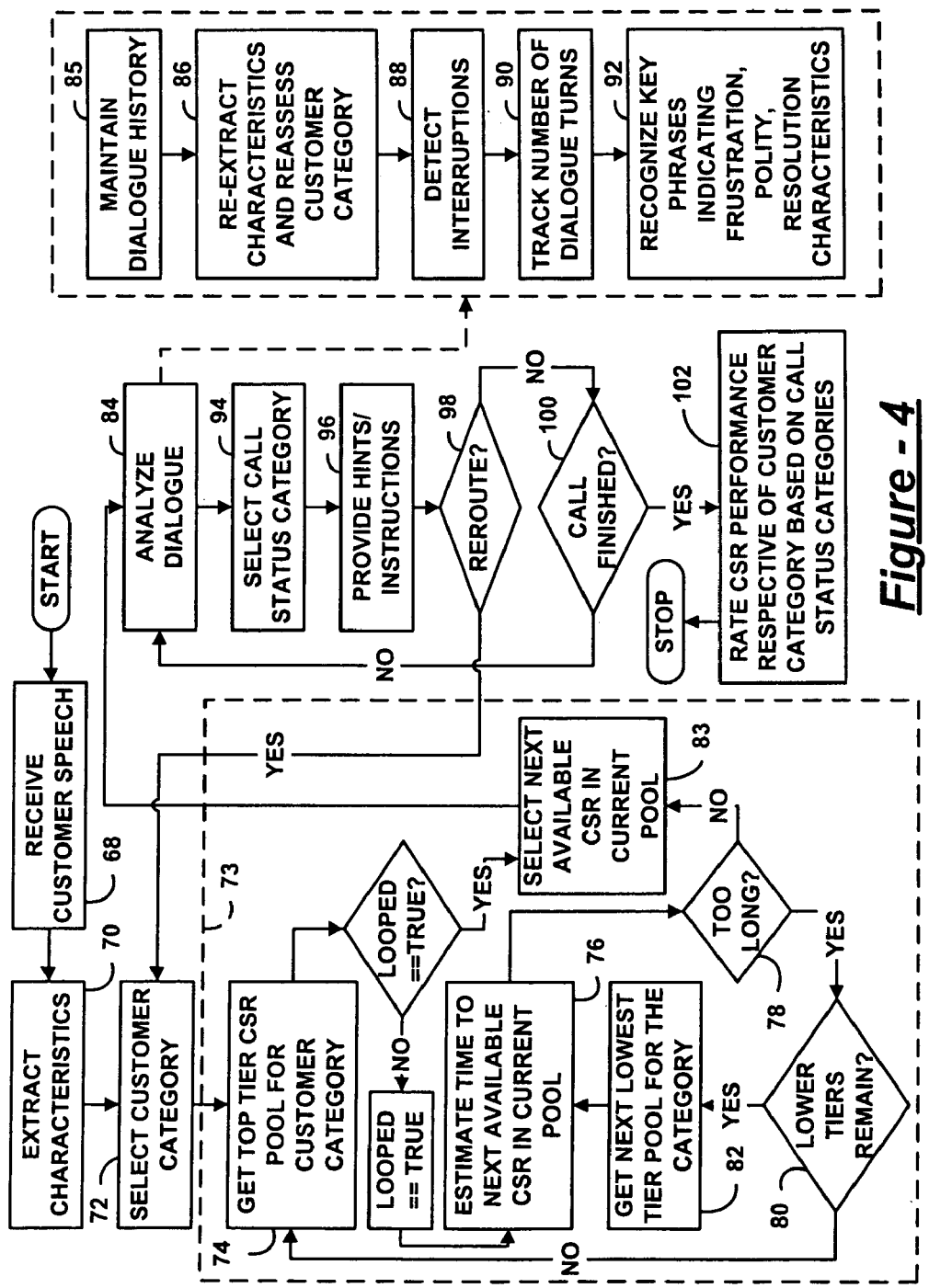
FIG. 4 is a flow diagram illustrating a call routing and supervising method according to the present invention.

Turning now to FIG. 4, a call routing and supervising method according to the present invention starts with receipt of customer speech from a remote location at step 68. Customer voice characteristics are then extracted at step 70 and a customer category selected at step 72 as discussed above. CSR selection occurs next at 73. According to some embodiments, the top tier CSR pool for the customer category is selected as a current pool at step 74. Next, the wait time for the next available CSR is estimated for the current pool at step 76, and a determination proceeds at decision step 78 whether the wait time is too long. If so, another determination is made at decision step 80 whether lower tiers in the category remain. If lower tiers remain, the next lowest tier is selected as the current pool at step 82 and processing returns to step 76. If no lower tiers remain, processing returns to step 74. If the wait time is not too long at decision step 78, then the next available CSR is selected at step 83, and the ensuing dialogue is analyzed at step 84. Alternatively or in addition, a cost function can be employed to select the CSR as discussed above with reference to FIG. 2.

Dialogue analysis can include maintaining a dialogue history at step 85, and re-extracting voice characteristics of customers and re-assessing the customer category at step 86. Interruptions can also be detected and tracked at step 88, along with a number of dialogue turns and overall time at step 90. Speech of the customer and CSR can further be recognized at step 92 for repetition detection and/or key phrase comparison. Predefined key phrases can be used at step 92 to detect polity, frustration, topic, resolution and other characteristics of the dialogue.

Analysis of dialogue at step 84 can be used at step 94 to select a call status category. At step 96, the call status category may be used to select predetermined hints and instructions for the CSR or to reroute the call at decision step 98. Once the call is finished at 100, the performance of the CSR can be rated with respect to the customer category at step 102 based on call status categories.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A call routing and supervising system, comprising:
an input receiving customer speech of a customer from a remote location;
voice characteristics extractor extracting voice characteristics from the customer speech based on trained models of a plurality of different groups of speakers;
a representative selector selecting one or more from a plurality of human customer service representatives to service the customer based on profiles of the plurality of human customer service representatives and the extracted voice characteristics, wherein the profiles map said plurality of human customer service representatives to said plurality of different groups of speakers; and
the representative selector being a self-tuning selector that adjusts the mapping of one of the plurality of human customer service representatives to said plurality of different groups of speakers based on customer satisfaction indicators extracted from voice characteristics of said customer speech, wherein the customer satisfaction indicators indicate a degree of satisfaction of the customer with the service provided to the customer by the one of the plurality of human customer service representatives.

2. The system of claim 1, further comprising a call monitor performing an automatic analysis of dialogue between the customer and a human customer service representative during interaction between the customer and the human customer service representative.

3. The method of claim 2, wherein said call monitor records performance of the human customer service representative respective of customers having the voice characteristics based on the analysis.

4. The system of claim 2, wherein said call monitor automatically selects predefined instructions based on the analysis and communicates the instructions to the human customer service representative during interaction between the customer and the human customer service representative.

5. The system of claim 4, wherein said human customer service representative selector suggests rerouting the call based on the analysis and selects a new one of plural human customer service representatives.

6. The system of claim 5, wherein said human customer service representative selector selects the new one of plural human customer service representatives based on previous performance of the human customer service representatives respective of customers having voice characteristics similar to the voice characteristics extracted from the customer speech.

7. The system of claim 5, wherein said human customer service representative selector selects the new one of plural human customer service representatives based on a preexisting supervisory relationship between the new human customer service representative and the human customer service representative interacting with the customer during the analysis.

8. The system of claim 2, wherein said call monitor performs the automatic analysis of dialogue by detecting interruptions.

9. The system of claim 2, wherein said call monitor performs the automatic analysis of dialogue by tracking a number of dialogue turns.

10. The system of claim 2, wherein said call monitor performs the automatic analysis of dialogue by recognizing speech content and comparing the speech content to key phrases adapted to detect frustration, polity, and resolution characteristics of the dialogue.

11. The system of claim 2, wherein said call monitor performs the automatic analysis of dialogue by at least once more extracting voice characteristics from the customer speech during the interaction and reassessing a categorization of the customer based on the voice characteristics extracted from the customer speech during the interaction.

12. A call routing and supervising method, comprising:
receiving customer speech from a remote location;
extracting voice characteristics from the customer speech using trained models of a plurality of different groups of speakers;
selecting one or more from a plurality of human customer service representatives based on profiles of the human customer service representatives that map to said plurality of different groups of speakers, wherein the profiles define voice characteristics of speech uttered by each of the plurality of human customer service representatives, wherein speech uttered by the selected one or more customer service representatives have voice characteristics similar to the voice characteristics extracted from the customer speech
extracting customer satisfaction indicators from voice characteristics of said customer speech; and
self-tuning the mapping of said plurality of different groups of speakers to said plurality of human customer service representatives to based on said customer satisfaction indicators.

13. The method of claim 12, further comprising performing an automatic analysis of dialogue between the customer and a human customer service representative during interaction between the customer and the human customer service representative.

14. The method of claim 13, further comprising recording performance of the human customer service representative respective of customers having the voice characteristics based on the analysis.

15. The method of claim 13, further comprising:
automatically selecting predefined instructions based on the analysis; and communicating the instructions to the human customer service representative during interaction between the customer and the human customer service representative.

16. The method of claim 15, further comprising:
instructing the human customer service representative to reroute the call based on the analysis; and selecting a new one of plural human customer service representatives.

17. The method of claim 16, wherein selecting the new one of plural human customer service representatives is based on previous performance of the human customer service representatives respective of customers having voice characteristics similar to the voice characteristics extracted from the customer speech.

18. The method of claim 16, wherein selecting the new one of plural human customer service representatives is based on a preexisting supervisory relationship between the new human customer service representative and the human customer service representative interacting with the customer during the analysis.

19. The method of claim 13, wherein performing an automatic analysis of dialogue includes detecting interruptions.

20. The method of claim 13, wherein performing an automatic analysis of dialogue includes tracking a number of dialogue turns.

21. The method of claim 13, wherein performing an automatic analysis of dialogue includes recognizing speech content and comparing the speech content to key phrases adapted to detect frustration, polity, and resolution characteristics of the dialogue.

22. The method of claim 13, wherein performing an automatic analysis of dialogue includes at least once more extracting voice characteristics from the customer speech during the interaction and reassessing a categorization of the customer based on the voice characteristics extracted from the customer speech during the interaction.

23. A call routing and supervising system, comprising:
an input that receives customer speech of a customer at a remote location;
a voice characteristics extractor that extracts voice characteristics from the customer speech based on trained models, wherein a trained model corresponds to a group of speakers from a plurality of different groups of speakers;
a customer categorizer that categorizes the customer into a customer category based on the voice characteristics extracted from the customer speech and the trained models;

a plurality of customer service representative profiles, wherein a customer service representative profile maps a particular customer service representative to a particular customer category;

a customer service selector that selects a customer service representative from a plurality of customer service representatives to service the customer based on the customer group of the customer and the profile of the customer service representative; and a call supervision component that monitors dialogue between the customer service representative and the customer and extracts customer service indicators indicating a degree of satisfaction of the customer from the voice characteristics extracted from the customer speech; and a profile updating component that updates the mapping of the customer service representative profile of the customer service representative to the customer category based on the customer service indicators extracted from the dialogue.

* * * * *